United States Patent
Marek et al.

(10) Patent No.: US 7,204,400 B2
(45) Date of Patent: Apr. 17, 2007

(54) METHOD FOR GLASS SEPARATION FOR FLAT PANEL DISPLAYS

(75) Inventors: Henry S. Marek, Fremont, CA (US); Robert Kwasnick, Palo Alto, CA (US); Ruben Horacio-Flores Moctezuma, Gilroy, CA (US); Fyodor I. Maydanich, Sanda Clara, CA (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 105 days.

(21) Appl. No.: 10/788,176

(22) Filed: Feb. 26, 2004

(65) Prior Publication Data

US 2004/0182903 A1    Sep. 23, 2004

Related U.S. Application Data

(62) Division of application No. 09/691,368, filed on Oct. 18, 2000, now Pat. No. 6,962,279.

(51) Int. Cl.
*B26F 3/00* (2006.01)

(52) U.S. Cl. ............ 225/1; 225/2; 225/93; 225/96.5; 225/103

(58) Field of Classification Search .......... 225/2, 225/82, 94, 96, 96.5, 105, 93, 1, 103; 83/879; 269/21; 7/164; 73/862.21, 862; 65/374.11, 65/174, 61, 112; 33/815
See application file for complete search history.

(56) References Cited

U.S. PATENT DOCUMENTS

| | | | | |
|---|---|---|---|---|
| 2,005,487 A | * | 6/1935 | Zemanek | ................ 225/103 |
| 2,041,869 A | * | 5/1936 | Smith et al. | ................ 73/821 |
| 2,331,762 A | | 2/1943 | Kottmann | |
| 2,534,756 A | | 12/1950 | Corrado | |
| 3,430,328 A | * | 3/1969 | Powell | ................ 65/17.1 |
| 3,462,835 A | * | 8/1969 | Fancher | ................ 30/164.95 |
| 3,601,296 A | | 8/1971 | Pick et al. | |

(Continued)

OTHER PUBLICATIONS

Electrostatic Dissipative Vacuum Pencil, Dec. 1, 1987, IBM Technical Disclosure Bulletin, NN871262.

*Primary Examiner*—Boyer D. Ashley
*Assistant Examiner*—Omar Flores Sánchez
(74) *Attorney, Agent, or Firm*—McAndrews, Reld & Malloy, Ltd.; Peter J. Vogel; Michael A. Dellapenna

(57) ABSTRACT

A method and apparatus for separating glass panels that minimizes process failures and improves separation process consistency by utilizing a separation handle which applies the minimal pressure necessary to remove the edge portion from the glass panel. The glass panel is cut along the score line, which outlines the edge portions of the glass panel to be removed. The panel is placed upon the separating apparatus, which pumps nitrogen along the underside of the glass panel, causing the glass panel to float above the apparatus. Locating pins are inserted to position the panel on the stage. Once the glass panel is in place, a vacuum sucks the panel against the stage, holding the panel tightly against the stage. The separation handle is then inserted over the edge portion to be removed. A measured force is applied to the handle, with the force incrementally increased until the slow, controllable separation of the edge is achieved. This level of force is maintained until separation is complete.

8 Claims, 4 Drawing Sheets

U.S. PATENT DOCUMENTS

| | | | |
|---|---|---|---|
| 3,790,051 A * | 2/1974 | Moore | 225/1 |
| 3,790,052 A * | 2/1974 | Toll | 225/2 |
| 3,907,185 A | 9/1975 | Suzuki | |
| 4,033,490 A * | 7/1977 | Ulivi | 225/1 |
| 4,090,420 A | 5/1978 | Insolio | |
| 4,114,433 A * | 9/1978 | Bowen | 73/862.21 |
| 4,195,760 A | 4/1980 | Bos | |
| 4,361,130 A | 11/1982 | Sprouse | |
| 4,403,533 A * | 9/1983 | Cox et al. | 83/56 |
| 4,409,843 A | 10/1983 | Urban et al. | |
| 4,683,680 A | 8/1987 | Bender | |
| 4,942,795 A | 7/1990 | Linke et al. | |
| 5,133,491 A | 7/1992 | Correl et al. | |
| 5,143,196 A * | 9/1992 | Henn et al. | 198/345.3 |
| 5,303,861 A | 4/1994 | Allaire et al. | |
| 5,413,263 A | 5/1995 | Bando | |
| 5,518,120 A | 5/1996 | Ahlm et al. | |
| 5,574,104 A | 11/1996 | Kolycheck et al. | |
| 5,820,006 A | 10/1998 | Turner | |
| 5,826,772 A | 10/1998 | Ariglio et al. | |
| 6,050,167 A | 4/2000 | Wilhite | |
| 6,234,051 B1 * | 5/2001 | Bareggi | 81/479 |
| 6,405,440 B1 * | 6/2002 | Clark et al. | 30/164.9 |

* cited by examiner

METHOD FOR GLASS SEPARATION FOR FLAT PANEL DISPLAYS

CROSS REFERENCE TO RELATED APPLICATIONS

The present application is a divisional of U.S. application Ser. No. 09/691,368, entitled "Apparatus and Method for Glass Separation for Flat Panel Displays," filed Oct. 18, 2000 now U.S. Pat. No. 6,962,276, which is hereby incorporated by reference in its entirety.

BACKGROUND OF THE INVENTION

The preferred embodiments of the present invention generally relate to a method and apparatus for separating glass panels such as those used in flat panel displays.

Liquid crystal displays or light imagers, such as those used in X-ray imaging systems, require the manufacture of circuitry on thin glass panels, for example comprising amorphous silicon transistors and photodiodes. The circuitry may range from as small as two centimeters to more than sixty centimeters on a side. Oftentimes, semiconductor devices are formed on the glass panel, making it even more difficult to handle the glass panels because touching the active area of the panel may result in damaging the semiconductor devices. Thus, in producing these panels, manufacturers often use a piece of glass with dimensions slightly larger than the final product dimensions. Then, prior to completing the product, the extra edge portions of the glass panel are removed, resulting in a glass panel with the desired dimensions.

The separation process generally requires two steps. First, the original glass panel is scored, outlining the desired shape and size of the final glass panel. Once scored, the unwanted edges are separated along the scoring lines to achieve the final desired product dimensions. This panel separation process is typically done by manual separation. The manufacturer simply places the unwanted edges between his or her thumb and index finger and applies pressure to the unwanted edges until the glass separates. This conventional method does not allow the person separating the glass to provide a controllable amount of force evenly along the entire edge to be separated, thereby making it difficult to control the direction of the separation crack. Therefore, manual separation often results in defects within the final glass panel. These defects may even be visible to the naked eye, and can reduce the yield of the product. Furthermore, excessive handling of the glass panel may cause electrostatic damage (ESD) to the circuitry. A glass panel with x-ray imager structures formed on it can cost tens of thousands of dollars to produce, but can be completely ruined if not correctly separated. Thus, a more reliable method and apparatus are needed for separating the unwanted portions of glass.

A need exists for an improved method and apparatus for separating glass panels. The preferred embodiments meet this and other needs that will become more apparent from the following description and appended claims and drawings.

BRIEF SUMMARY OF THE INVENTION

A method and apparatus are provided for separating glass panels that provide more consistent separation and minimize separation defects in the glass panel. A preferred embodiment of the present invention includes a separation handle that applies the minimal pressure necessary to separate the glass evenly along the unwanted edge portions to be removed.

In a preferred embodiment, the scored panel is placed upon a stage, which is covered by an electrically dissipative material to prevent any electrostatic discharge from destroying the semiconductors etched in the glass panel. Nitrogen gas is pumped along the underside of the glass panel, causing the glass panel to float above the stage during positioning. Locating pins are inserted into holes located along the side of the stage to accurately position the panel. This allows successive glass panels to be placed in the same location on the stage, allowing for more consistent separation.

Once the glass panel is in place, a vacuum sucks the panel against the stage, holding the panel tightly against the stage. The separation handle is then inserted over the edge portion to be removed. A force gauge is attached to the separation handle to measure the amount of force applied to the glass panel. The force is incrementally increased until slow, controlled separation of the edge is achieved. The level of force is maintained until separation is complete. By using the minimal force in separating the glass, the likelihood of separation defects is greatly reduced. The stage is mechanically rotated without lifting or repositioning the glass panel before each subsequent separation, reducing the risk of ESD.

These and other features of the preferred embodiments of the present invention are discussed in the following detailed description of the preferred embodiments of the present invention. It shall be understood that other features and advantages will become apparent to those skilled in the art upon review of the following detailed description, drawings, and claims.

DETAILED DESCRIPTION OF THE INVENTION

Figure 1:
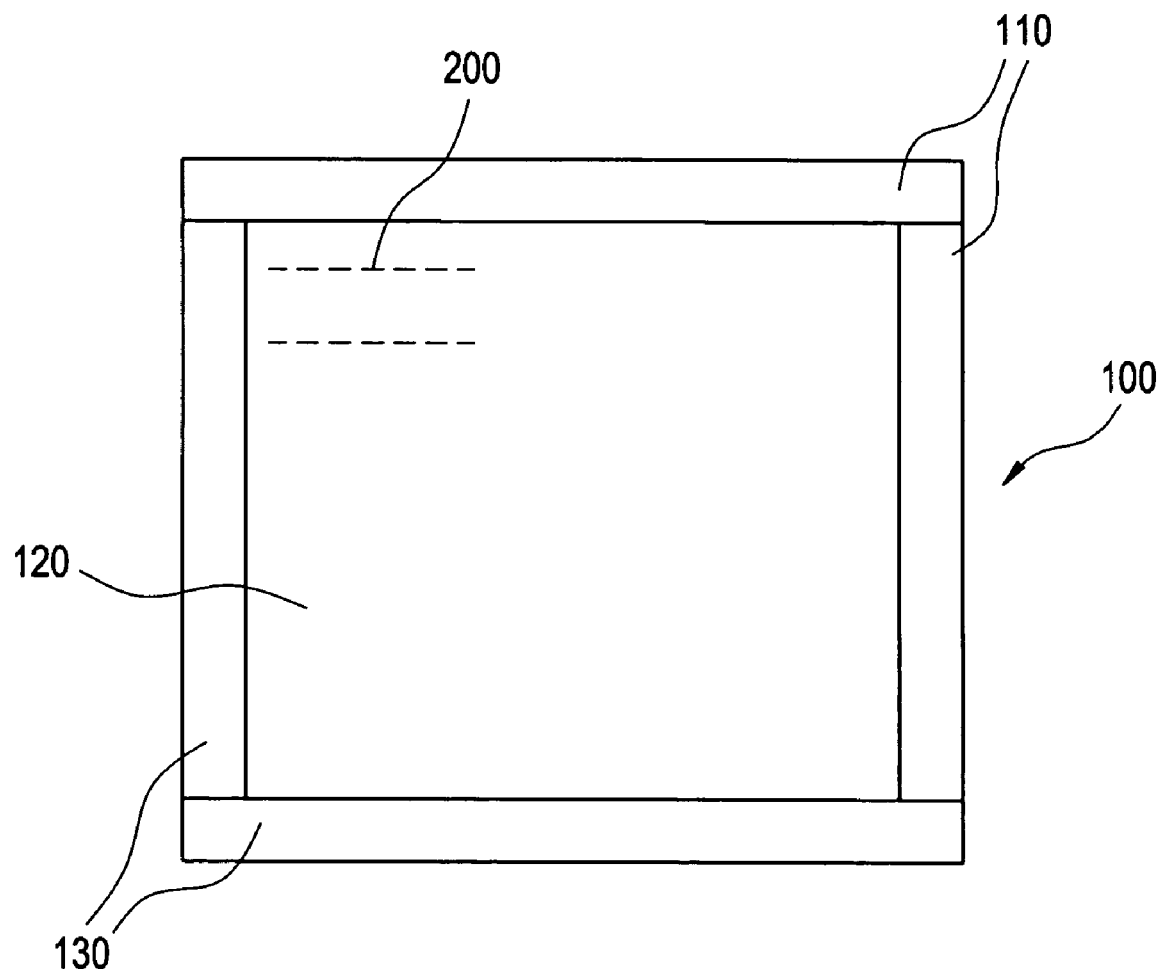
FIG. 1 illustrates a scored glass panel prior to separation.

FIG. 1 illustrates a glass panel 100, such as a glass panel used in liquid crystal displays or X-ray imagers. Such glass panels 100 may range in size, such as from about 2 to 60 centimeters on a side, and may range in thickness, such as from about 0.5 to 2 millimeters in thickness. Typical panels are made from the Corning Corporation's Code 7059 or Code 1737 glass. The original glass panel 100 used in the manufacturing process is larger than the final product, and thus the unwanted edges must be separated to produce a final product with desired dimensions. As seen in FIG. 1, the glass panel 100 is cut along score lines 110, thereby defining an inner panel 120 of desired dimension and edge portions 130, which are to be removed. The glass panel 100 may be scored with a diamond or tungsten carbide tool, and may be scored at anytime prior to the separation process.

Figure 2:
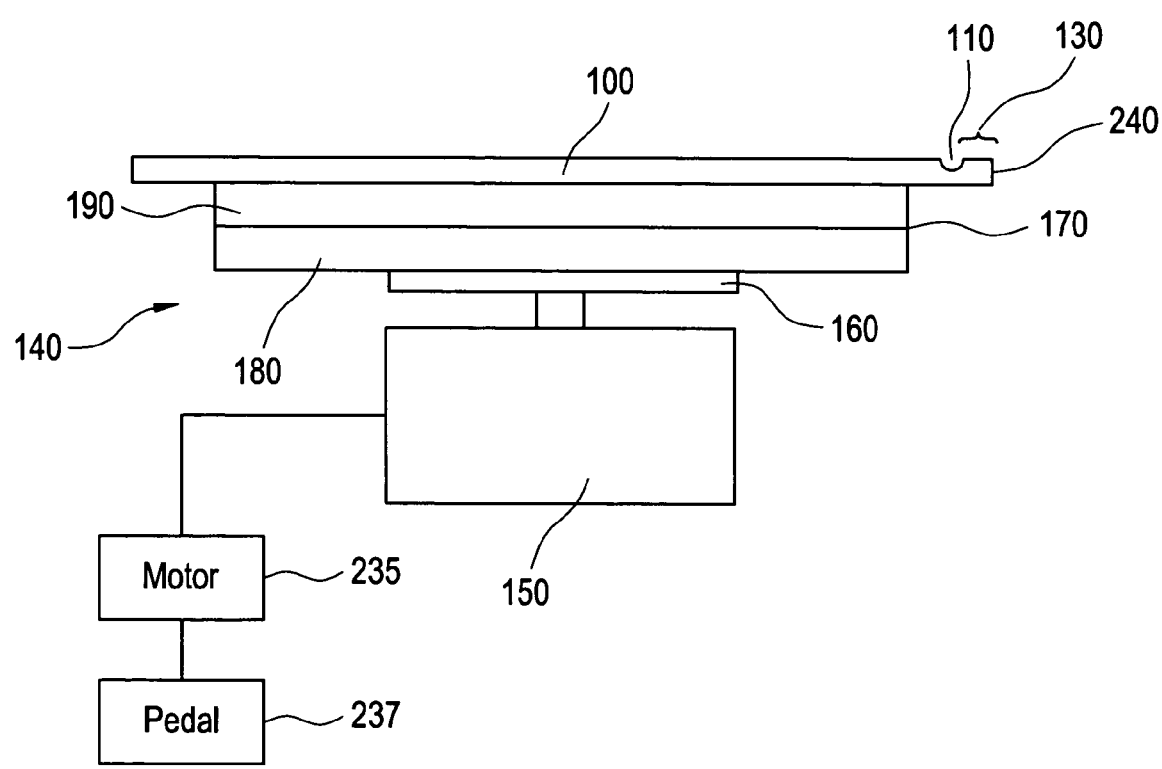
FIG. 2 illustrates a schematic of a glass separating apparatus in accordance with a preferred embodiment of the present invention.

FIG. 2 illustrates a glass separating apparatus 140 for separating the unwanted edge portion 130 of the glass panel 100. As shown, the glass separating apparatus 140 includes an electrically grounded positioner 150 for preventing any electrical discharge, a jig-slotted turntable 160, and a stage 170. The stage 170 is comprised of a base portion 180 that is covered by a charge dissipative material 190. In a preferred embodiment of the present invention, the base portion 180 is made of aluminum, while the charge dissipative material 190 is a polyacetal plastic alloy, such as Pomalax, which is available from Westlake Plastics in Lenix, Pa.

Figure 3:
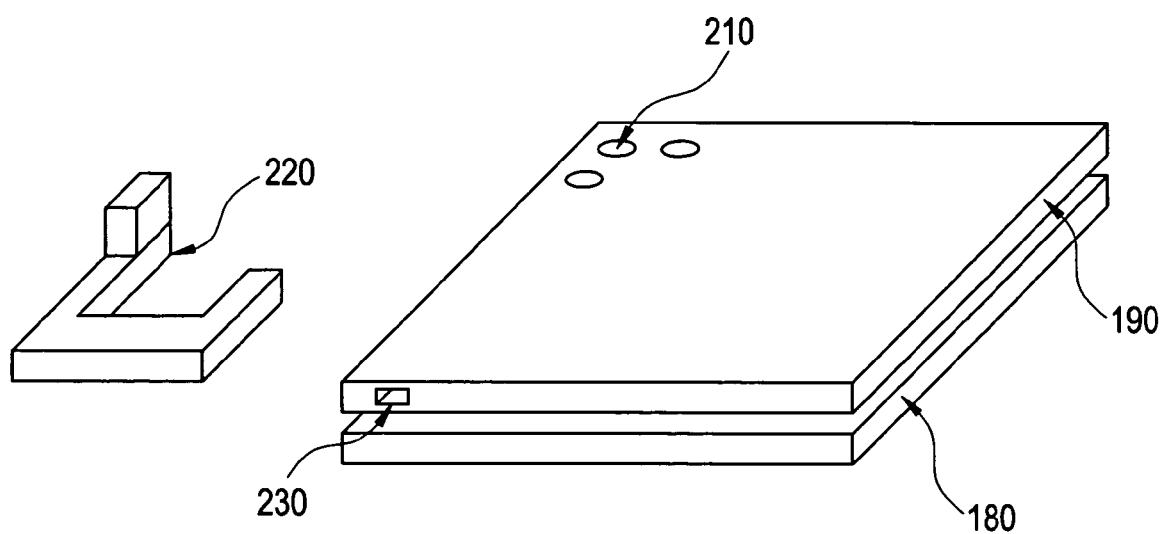
FIG. 3 illustrates the components of the separation stage of a preferred embodiment of the present invention.

During operation, the glass panel 100 is placed upon the glass separating apparatus 140. As mentioned above, semiconductor devices 200 may be formed on the glass panel 100. Since rubbing the glass panel 100 along the top surface of the separating apparatus 140 may cause electrostatic discharge that could damage semiconductor devices 200, nitrogen gas is pumped through channels 210 in the stage 170 along the entire underside of the glass panel 100. This causes the glass panel to float just above the surface of the charge dissipative material 190. For simplicity only three channels 210 are shown in FIG. 3; however numerous channels 210 are similarly spaced along the entire surface of stage 170.

Once the glass panel 100 is floating above the separating apparatus 140, locating pins 220 are inserted in locating holes 230 in the side of the stage 170. In a preferred embodiment, three locating pins 220 are inserted into three different sides of the stage 170 to precisely locate the glass panel 100 above the separating apparatus 140. By using the same locating pins 220 in the same locating holes 230, each glass panel 100 will be located in the same position on the separating apparatus 140, thereby allowing easy automation of the separating process.

After locating the glass panel 100, the separating apparatus 140 switches from pumping nitrogen gas through the channels 210 to providing a vacuum for sucking the glass panel 100 tightly against the charge dissipative material 190. This vacuum keeps the glass plate 100 from sliding along the separating apparatus 140, which prevents any electrostatic discharge from damaging the semiconductor devices 200. As seen in FIG. 2, the outer portion of the glass panel 100, including the edge portion 130, is located outside the periphery of the separating apparatus 140. In a preferred embodiment, each of the four edge portions 130 is located outside the periphery of the separating apparatus 140 so that the user need only locate the glass panel 100 one time in order to remove all four edge portions 130, thereby reducing the risk of electrostatic damage while locating the glass panel 100. The stage 170 may be rotated without manual handling by motor 235 before each subsequent edge separation, to further reduce the chance of ESD. In a preferred embodiment of the present invention, a pedal 237 controls the action of the motor 235. By way of example, the score line 110 may extend about 0.1 to 1.5 millimeters past the stage 170, while the outer edge 240 of the glass plate 100 may extend 0.1 to 2.5 centimeters past the stage 170.

Figure 4:
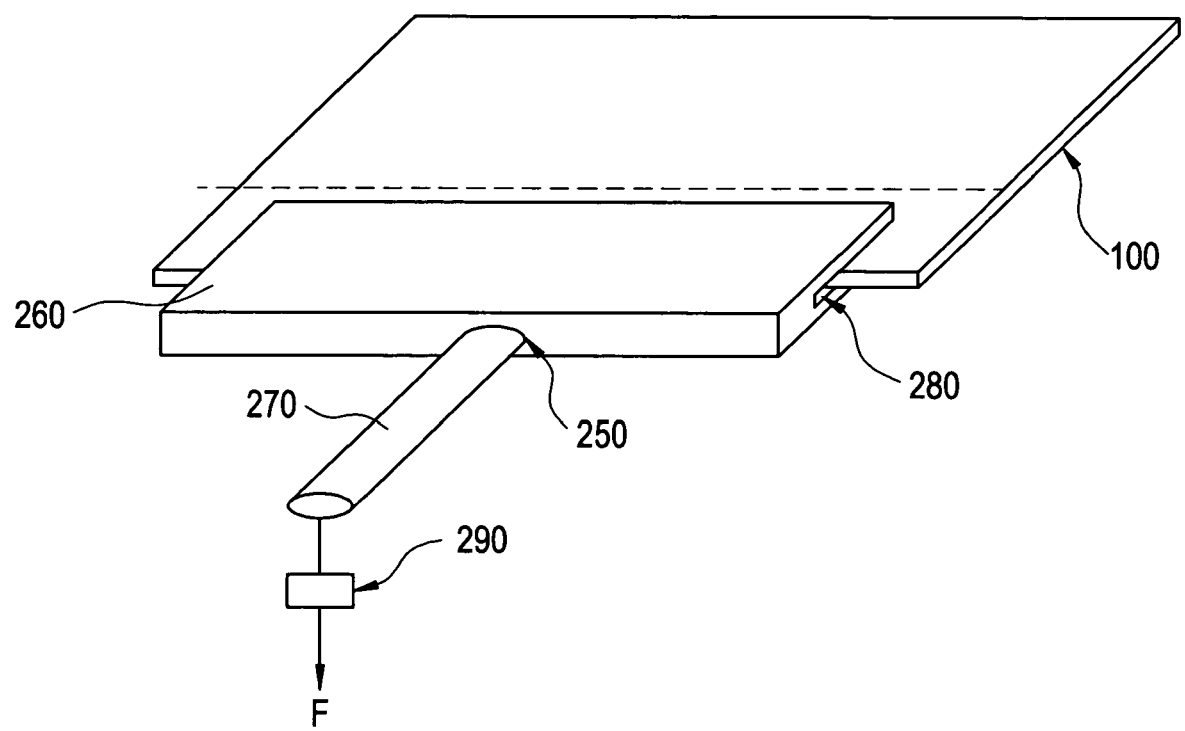
FIG. 4 illustrates a separation handle in accordance with a preferred embodiment of the present invention.

Turning to FIG. 4, a preferred embodiment of the present invention includes a separation handle 250 for removing the edge portion 130. The separation handle 250 includes slotted plate 260 attached to a handle 270. The slotted plate 260 also comprises an electrically dissipative material 280 to prevent electrostatic discharge on the surfaces in contact with the glass panel 100. In the preferred embodiment, the dissipative material 280 is identical to the charge dissipative material 190 on the stage 170.

To separate one edge portion 130 from the inner portion 120, the edge portion 130 is inserted into the recess of the slotted plate 260. In the preferred embodiment, the slotted plate 260 should extend between 0.1 and 2.0 centimeters over the edge portion 130, and preferably within 0.1 millimeters from the score line 110. The person separating the glass panel then applies force to the handle 270. A force gauge 290 is attached to the separation handle 250 to measure the force (F) applied to the handle 270, and in turn the edge portion 130. The force is incrementally increased until slow, controllable separation is achieved. This level of force is maintained until separation is complete. This allows the person separating the glass panel 100 to apply the minimal force necessary to complete separation. Since additional force may cause defects within the glass, applying the minimal force minimizes the likelihood that defects will be present in the final product. Furthermore, the pressure is applied evenly along the width of the slotted plate 260, thereby causing a cleaner and more even break along the score line 110. This even pressure helps prevent sharp lips from forming on the bottom edge of the final product.

Once the edge portion 130 of one side of the glass panel 100 is removed, the separating process is repeated for the remaining three sides. In the preferred embodiment, each of the remaining edge portions 130 is located outside the periphery of the separating apparatus 140 so that the glass panel 100 does not need to be relocated prior to removing the remaining three sides. The separating apparatus 140 is attached to a jig-slotted turntable 160 which allows the separating apparatus 140 to be mechanically rotated so that the user does not have to adjust his or her position in order to access the remaining sides. In the alternative, the separation process can be automated by applying the known separation force to each edge portion simultaneously or in turn.

The embodiments of the present invention, as described above, were tested to insure that the minimum number of defects occurred. Among the tests conducted on typical panels was measuring the minimum force necessary to separate a given panel, and once separated, to inspect the separated edges for cracks or other defects. The results are shown in Table 1.

TABLE 1

| Separation Number | Force at separation (in grams) | Were any chips or cracks noticed on the edges? |
|---|---|---|
| uz,5/8 Panel 1 | | No |
| 1$^{st}$ | 80 | No |
| 2$^{nd}$ | 80 | No |
| 3$^{rd}$ | 100 | No |
| 4$^{th}$ | 100 | No |
| Panel 2 | | |
| 1$^{st}$ | 60 | No |
| 2$^{nd}$ | 120 | No |
| 3$^{rd}$ | 120 | No |
| 4$^{th}$ | 60 | No |
| Panel 3 | | |
| 1$^{st}$ | 100 | No |
| 2$^{nd}$ | 150 | No |
| 3$^{rd}$ | 120 | No |
| 4$^{th}$ | 120 | No |

It is evident from the above Table 1 that the tested glass panels were able to withstand a separation force in the range of 80–150 grams without producing any edge defects. It should be understood that this range of forces will vary depending on the type of glass used.

The second test included measuring the median vent depth along six segments of the separated edges and inspecting these edges for the loss of median vent. Once the edge portions were removed, the propagation edge was examined to determine the precise location of the median vent cracks along the top and bottom (x) and left and right edges (y) of the panel. Any large variation in this location could lead to defects within the final product. The following results show the consistency of the median vent, along with evidence that no median vent loss occurred:

TABLE 2

|  | Segment | | | | | | Median Vent loss? |
| --- | --- | --- | --- | --- | --- | --- | --- |
|  | 1 | 2 | 3 | 4 | 5 | 6 | |
| Average depth (y) in microns | 178 | 160 | 171 | 169 | 169 | 162 | No |
| Average depth (x) in microns | 124 | 137 | 132 | 132 | 123 | 116 | No |

Although it may appear that there is a variation in the test measurements, the measurements are in microns, and thus, these slight variations are minimal at best.

Finally several panels were scored and separated, and once separated, the final product was tested to determine if the separation process had lowered the flexural strength of the glass panel. This test included several different variables, such as the number of edges that were separated, the pressure applied during scoring, and whether the layers were deposited on the glass panel prior to separation. The results are shown in Table 3:

TABLE 3

|  | Group 1 | Group 2 | Group 3 | Group 4 |
| --- | --- | --- | --- | --- |
| Edges Removed | 1 | 2 | 1 | 2 |
| Pressure at scoring (psi) | 24 | 24 | 30 | 30 |
| Layers deposited | 1 | 0 | 0 | 1 |
| Average Flexural Strength (psi) | 20912 | 19503 | 21522 | 15111 |
| Standard Deviation (psi) | 2376 | 5135 | 2780 | 5414 |

These results, which show an average tensile strength of roughly 15,000 to 21,000 psi compare to the strength of an unseparated glass panel. These results prove that the separation process described herein does not increase the number of edge defects.

It is apparent from the previous description that the preferred embodiment of the present invention provides a novel system that satisfies the objectives and advantages set forth above. While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

What is claimed is:

1. A method for separating edge portions of a glass panel etched with semiconductor circuitry, said method comprising:
    scoring said glass panel to outline at least one edge portion of said glass panel to be removed;
    manually applying a separating force evenly along a substantial portion of said at least one edge portion to be removed using a separation handle;
    measuring said separating force with a force gauge; and
    controlling an amount of force applied to said glass panel to use a minimal amount of force necessary to separate said at least one edge portion.

2. The method of separating a glass panel of claim 1 wherein said top surface of said separating apparatus is made of an electrostatic dissipative material.

3. The method of separating a glass panel of claim 1 wherein said glass panel is located by utilizing multiple locating pins to position said glass panel on said separating apparatus.

4. The method of claim 1, further comprising:
    placing said glass panel upon a top surface of a separating apparatus; and
    locating said glass panel upon said separating apparatus at a predetermined position with respect to a reference point, in order to locate a scoring line on the flat panel at a desired position relative to the separating apparatus.

5. The method of separating a glass panel of claim 4 wherein said glass panel floats above said separating apparatus while said glass panel is being located.

6. The method of separating a glass panel of claim 1 further comprising:
    applying a similar force to the remaining edge portions to be removed without relocating said glass panel on said separating apparatus.

7. The method of separating a glass panel of claim 6 wherein said separating apparatus provides a vacuum to hold said glass panel tightly against said separating apparatus once said glass panel is located on said separating apparatus.

8. A method of separating edge portions of a glass panel etched with semiconductor circuits, said method comprising:
    scoring said glass panel to outline at least one edge portion of said glass panel to be removed;
    manually applying a separating force evenly along a substantial portion of said at least one edge portion to be removed using a separation handle;
    placing said glass panel proximate the top surface of a separating apparatus;
    pumping gas under said glass panel so that said glass panel floats above said separating apparatus;
    locating said glass panel using locating pins;
    providing a vacuum to hold said glass panel tightly against said separating apparatus;
    applying said separating force to the edge of said glass panel until said edge is removed;
    measuring said separating force with a force gauge;
    controlling an amount of force applied to said glass panel to use a minimal amount of force necessary to separate said at least one edge portion;
    applying a similar force to the remaining edge portions to be removed without relocating said glass panel on said separating apparatus.

* * * * *